W. T. & W. C. RENFRO.
WHEEL SULKY PLOW.
APPLICATION FILED AUG. 23, 1911.

1,035,233.

Patented Aug. 13, 1912.
3 SHEETS—SHEET 1.

Witnesses
Thos. F. Knox,

Inventors
William T. Renfro,
William C. Renfro
By Victor J. Evans
Attorney

COLUMBIA PLANOGRAPH CO., WASHINGTON, D. C.

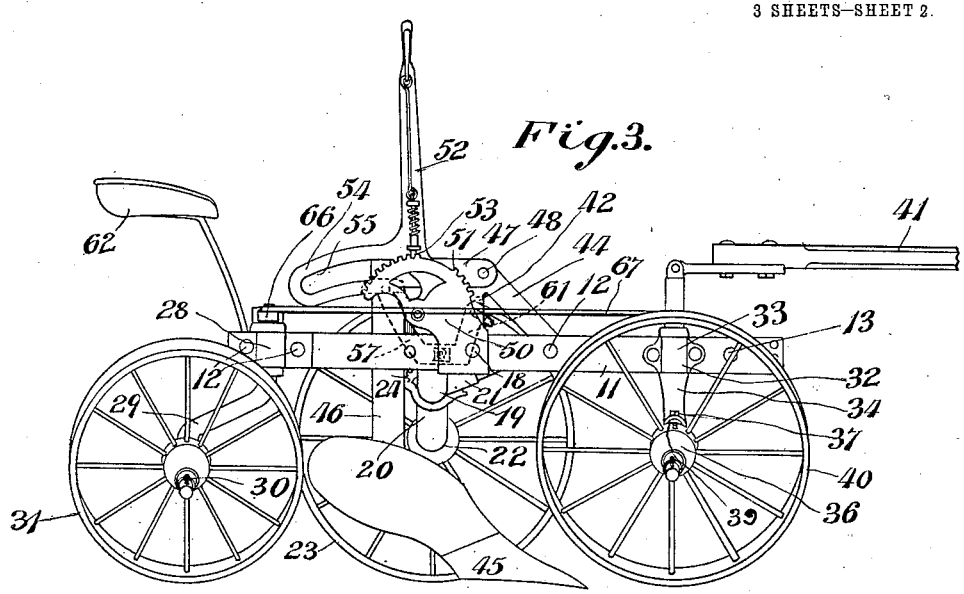

W. T. & W. C. RENFRO.
WHEEL SULKY PLOW.
APPLICATION FILED AUG. 23, 1911.
1,035,233.
Patented Aug. 13, 1912.
3 SHEETS—SHEET 3.
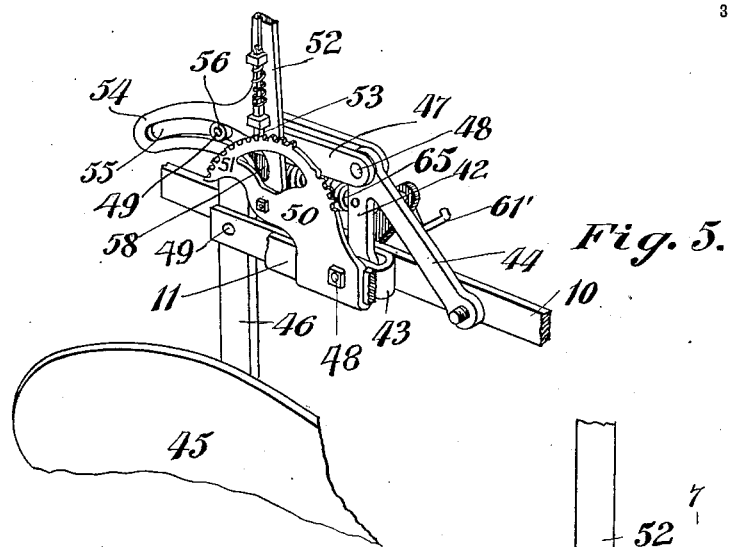
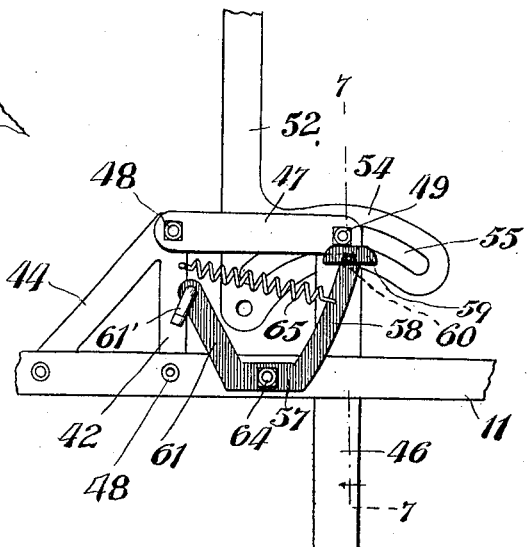
Witnesses
Thos. F. Knox,
Inventors
William T. Renfro,
William C. Renfro
By Victor J. Evans
Attorney

UNITED STATES PATENT OFFICE.

WILLIAM T. RENFRO AND WILLIAM C. RENFRO, OF HILLSBORO, TEXAS.

WHEEL SULKY-PLOW.

1,035,233.  Specification of Letters Patent.  Patented Aug. 13, 1912.

Application filed August 23, 1911. Serial No. 645,471.

*To all whom it may concern:*

Be it known that we, WILLIAM T. RENFRO and WILLIAM C. RENFRO, citizens of the United States, residing at Hillsboro, in the county of Hill and State of Texas, have invented new and useful Improvements in Wheel Sulky-Plows, of which the following is a specification.

The invention relates to wheel plows, and more particularly to the class of foot-actuated auxiliary lifting attachments for wheel sulky plows.

The primary object of the invention is the provision of an attachment of this character in which the plow of the implement may be readily and easily lifted, so as to obviate the possibility of breakage of the throw lever segment or its coöperative parts, resultant from the weight of the said plow, or the resistance exerted thereon by the ground when the plow is in operation.

Another object of the invention is the provision of an attachment of this character in which the operator may raise the plow standard either by foot or hand pressure, or both, thereby making it easier for the operator to control the plow in its operation.

A further object of the invention is the provision of a foot lever attachment of the class described, in which the plow standard may be raised with the least possible friction, and requiring a minimum amount of exertion on the part of the operator, and also obviating the entire strain on the throw lever for raising and lowering the plow standard.

A still further object of the invention is the provision of an attachment of this character which is simple of construction, capable of being readily and easily mounted upon the plow frame, reliable and efficient in operation, and inexpensive in manufacture.

With these and other objects in view, the invention consists in the construction, combination and arrangement of parts, as will be hereinafter more fully described, illustrated in the accompanying drawings, and pointed out in the claims hereunto appended.

Figure 1:
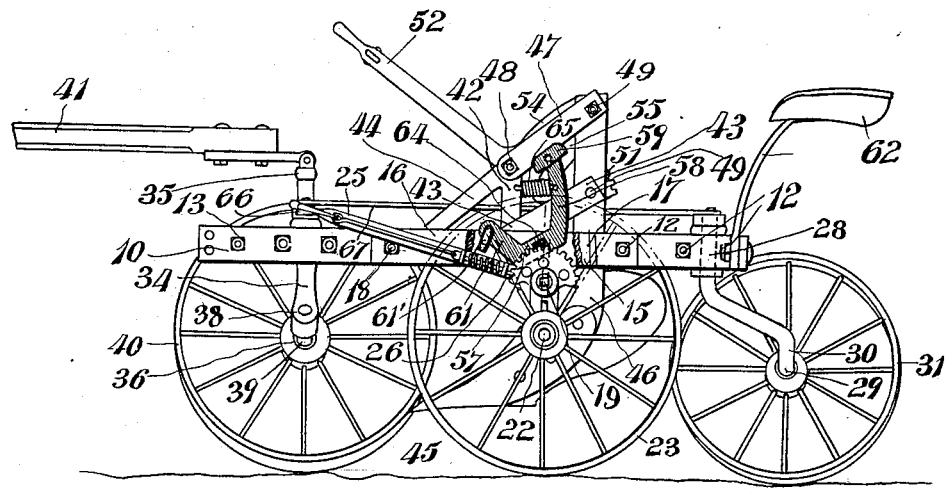
Figure 2:
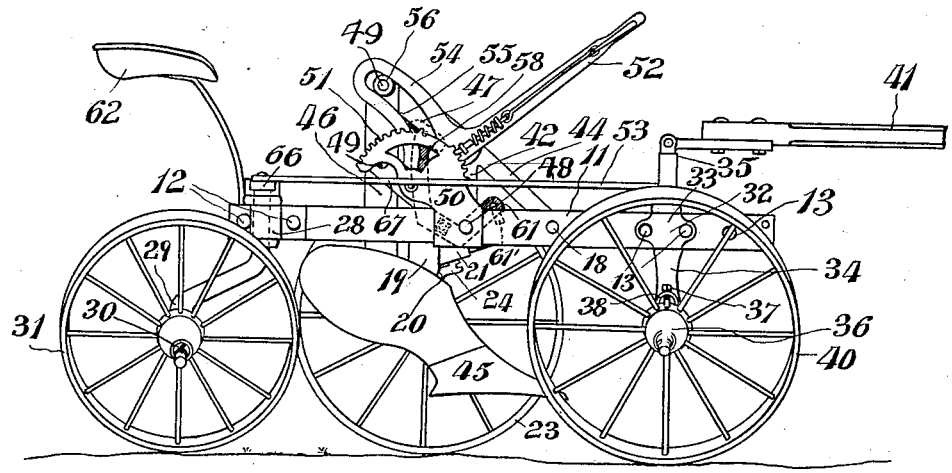

In the drawings: Figure 1 is a side elevation of the landside of a wheel sulky plow, with the attachment mounted thereon constructed in accordance with the invention, the plow being shown in raised position. Fig. 2 is a side elevation of the furrow side of the plow, such plow being raised. Fig. 3 is a similar view, showing the plow in lowered position. Fig. 4 is a top plan view. Fig. 5 is a detail perspective view of the mechanism employed to raise and lower the plow, the foot lever being also in operative position relative thereto. Fig. 6 is a further detail view of said mechanism in elevation. Fig. 7 is a sectional view on the line 7—7 of Fig. 6.

Similar reference characters indicate corresponding parts throughout the several views of the drawings.

Referring to the drawings by numerals, the frame of the machine comprises two straight flat parallel bars 10 and 11, the rear end of the furrow side bar being bent inwardly and secured to the land side bar 10 by means of a bolt 12. The forward ends of the bars are secured by means of a bolt 13 having mounted thereon and interposed between said bars a sleeve 14 which holds the bars the required distance apart. To the rear part of the landside bar is secured the land wheel frame or brace 15, which is substantially triangular in form and consists of a straight member 16 and a rearwardly curved member 17. The curved member 17 is secured to the said rear end of the bar 10 by means of the bolt 12. The forward straight member is secured to the bar 10 by means of a bolt 18 which passes through both bars 10 and 11, for a purpose hereinafter more fully described. The member 16 projects diagonally with respect to the landside bar.

On the outer end of the land wheel frame is formed a spindle 19 which projects at right angles to the said landside bar, the spindle 19 being surrounded by means of a collar 20 having a radially projecting arm 21, on the end of which is formed a projecting spindle 22, upon which the land wheel 23 is mounted. Secured to the outer end of the spindle 19 is a toothed sector 24, and suitably secured in a seat formed in the collar 20 is a land wheel lever 25, by means of which the said wheel may be raised or lowered as usual. The lever 25 is provided with a suitable locking dog 26 which engages the toothed sector and locks the wheel when adjusted to the desired position.

To the rear end of the bar 10 is secured a bar 27, having a vertical bearing 28 formed thereon, which is located at the extreme rear end of the frame, and in this bearing is journaled a crank axle 29, terminating in a spindle 30, upon which is journaled a rear or caster wheel 31, the latter being adapted to follow in the furrow which is being turned by the plow.

Secured to the furrow side bar 11 of the frame, near its forward end, by suitable bolts is a bracket 32 having formed thereon a vertical bearing 33, in which is mounted a vertical shaft 34, extending entirely through the same and having on its upper end an arm 35 arranged at right angles to the said vertical shaft, for a purpose as will be hereinafter more fully described. Mounted on the lower end of the vertical shaft 34 is a sleeve 36, the same being attached thereto by means of a set screw or bolt 37, the sleeve being formed with a suitable horizontal socket, and projecting at right angles therefrom, is a crank axle 39 carrying a front or furrow wheel 40. Connected with the arm 35 of the vertical shaft is a pole or tongue 41, which is capable of upward swinging movement and also horizontal lateral swinging movement. Thus, it will be seen that when the tongue or pole is swung laterally, the front or furrow wheel will be turned for the guiding of the plow.

Secured between the bars 10 and 11 is a standard 42, and upon the bolt 13 is mounted a sleeve 14, thus keeping the bars of the frame equi-distant throughout their length, and preventing the plow standard, which passes between the same, from being jammed therebetween, when the bolt 13 is tightened. The standard 42 is arranged at right angles to the frame, and has formed integral therewith an inclined brace 44, the lower headed end of which is secured between the bars of the frame in any suitable manner.

Below the frame is arranged a plow 45 which is constructed without a landside bar, and is supported by a straight standard 46 which extends up between the bars of the frame. The plow standard 46, is connected to the standard 42 by means of parallel pairs of lower and upper links 43 and 47 pivoted to both standards, and of equal length between their pivotal points. The distance between the pivotal points of the plow standard is also the same as the distance between the pivotal points in the upright or standard secured to the frame, of the pairs of links 43 47 which are formed from two straight pieces, the forward ends of which are placed on either side of the standard 42, and are pivoted thereto by means of a bolt 48, while the opposite ends of the links are connected to the standard 46 by means of a pivot 49.

Secured to the furrow side of the frame is a plate 50, which has formed integral therewith a toothed sector 51, and pivoted to this plate 50 is a lifting or operating lever 52 carrying a spring-held hand actuated locking dog 53 adapted for engagement with the teeth of the sector and to move freely thereon, the dog, when engaged with the sector, being adapted to hold the lever in adjusted position. The lever 52 is also provided with an arm 54, having formed therein a cam-shaped slot 55, in which a friction roller 56 engages, the roller being journaled upon the pivot 49, connecting the links 47 to the plow standard 46. When the spring locking dog is released from the sector, and the lever is moved in one direction, it will effect the raising of the plow 45 from the ground, and on reverse movement of the lever 52, the said plow may be located relative to the ground. It is evident that any desired depth may be plowed by locking the lever 52 by its spring dog to the desired point on the sector.

The foot-actuated auxiliary lifting mechanism comprises a substantially U-shaped lever 57 having its long arm 58 provided, at its free end, with a yoke 59, in which is journaled a friction roller 60, the latter being engaged with the lower edge of the outer link 47, the yoke being adapted to straddle the said link, so as to prevent lateral displacement of the lever, while the short arm 61 of the lever is formed with a laterally extending foot stirrup 61′ to be engaged by the foot of an operator, when mounted upon the machine and resting in the seat 62 carried by the standard fixed to the rear end of the machine. The lever 57, between the long and short arms 58 and 61, thereof, is pivoted, as at 64, to the bar 10 of the plow frame, so that upon downward pressure upon the stirrup 61′, the plow standard 46 may be raised from the ground.

It is evident that the operator may raise the plow standard 46 by either the hand lever 52 or the foot lever 57, or both, that is to say, by operating the same simultaneously.

Suitably secured to the bar 10 of the plow frame, forwardly of the long arm 58 of the foot lever 57, is a spring member 65, the same being connected to said long arm 58 of the said foot lever, so as to assist the same when lifting the plow standard 46.

Fixed to the member 29, at the upper end thereof, is a crank 66, to which is pivotally connected a union bar 67, the latter being also pivotally connected to the arm 35, so that upon movement of the front wheel 40, the caster wheel 31 will be simultaneously turned therewith in the guiding of the plow.

What is claimed is:

1. In a plow, a frame, including spaced parallel bars, a plow standard slidable between said bars, a plow body carried by said standard at its lower end, a bracket fixed to the bars, links pivoted to the bracket and to the upper end of the standard, a sector fixed to the frame, a lifting lever pivoted to the sector and having a cam slotted arm carried by one of the pivots connecting the links to the standard, means carried by the lever and engageable with the sector for locking said lever in adjusted position, and manually controlled means pivoted to the frame and engageable with one of the links for assisting in lifting the standard on the operation of the lever.

2. In a plow, a frame, including spaced parallel bars, a plow standard slidable between said bars, a plow body carried by said standard at its lower end, a bracket fixed to the bars, links pivoted to the bracket and to the upper end of the standard, a sector fixed to the frame, a lifting lever pivoted to the sector and having a cam slotted arm carried by one of the pivots connecting the links to the standard, means carried by the lever and engageable with the sector for locking said lever in adjusted position, a foot pedal pivoted to the frame and having a yoke at one end straddling one of the said links, and a friction roller journaled in said yoke and engageable with the adjacent link.

3. In a plow, a frame, including spaced parallel bars, a plow standard slidable between said bars, a plow body carried by said standard at its lower end, a bracket fixed to the bars, links pivoted to the bracket and to the upper end of the standard, a sector fixed to the frame, a lifting lever pivoted to the sector and having a cam slotted arm carried by one of the pivots connecting the links to the standard, means carried by the lever and engageable with the sector for locking said lever in adjusted position, a foot lever pivoted to the frame and having a yoke at one end straddling one of the said links, a friction roller journaled in said yoke and engageable with the adjacent link, and spring means connected with the frame and the foot lever for assisting the same when operated by pedal pressure for raising the plow standard.

In testimony whereof we affix our signatures in presence of two witnesses.

WILLIAM T. RENFRO.
WILLIAM C. RENFRO.

Witnesses:
GEO. CARMICHAEL,
M. H. DE WITT.

---

Copies of this patent may be obtained for five cents each, by addressing the "Commissioner of Patents, Washington, D. C."